United States Patent Office 3,452,017
Patented June 24, 1969

3,452,017
PRODUCTION OF ALKYL SUBSTITUTED 4-HYDROXY-, ALKOXY- OR ALKOXY ALKOXY-PROPYLENE UREAS OR PROPYLENE THIOUREAS
Harro Petersen, Frankenthal, Pfalz, Germany, assignor to Badische Anilin- & Soda-Fabrik Aktiengesellschaft, Ludwigshafen (Rhine), Germany
No Drawing. Filed Aug. 14, 1967, Ser. No. 660,180
Claims priority, application Germany, Aug. 17, 1966, B 88,510; Aug. 18, 1966, B 88,523
Int. Cl. C07d 51/16; C05f 11/00
U.S. Cl. 260—251                                6 Claims

ABSTRACT OF THE DISCLOSURE

The production of propylenureas and propylenethioureas bearing a hydroxy group or an alkoxy group in 4-position and other substituents in the 1-, 3- and/or 5-positions by reacting methylolurea compounds or methylolthiourea compounds (or reaction mixtures from the reaction of ureas or thioureas with formaldehyde) with alkylolurea compounds or alkylolthiourea compounds (or reaction mixtures from the reaction of ureas or thioureas with aldehydes) in the presence or absence of an alkanol, and the new 4-hydroxypropylenureas, 4-alkoxypropylenureas, 4-hydroxypropylenethioureas and 4-alkoxypropylenethioureas bearing hydrogen atoms or alkyl groups having one to four carbon atoms in the 1- and 3-positions and alkyl groups having one to four carbon atoms in the 5-position themselves. The new products are slow-release fertilizers and valuable intermediates for the manufacture of leather auxiliaries, auxiliaries for the paint and lacquer industry, and pesticides.

This invention relates to the production of propylenureas and propylenethioureas bearing a hydroxy group or alkoxy group in the 4-position and other substituents in the 1-, 3- and/or 5-positions by the reaction of methylolurea compounds or methylolthiourea compounds with alkylolurea compounds or alkylolthiourea compounds.

It is an object of this invention to provide a new process for the production in good yields of propylenureas and propylenethioureas which bear a hydroxy group or alkoxy group in the 4-position and other substituents in the 1-, 3- and/or 5-positions from easily accessible starting materials.

A further object of this invention is to provide new 4 - hydroxypropylenureas, 4 - alkoxypropylenureas, 4 - hydroxypropylenethioureas and 4-alkoxypropylenethioureas bearing hydrogen atoms or alkyl groups having one to four carbon atoms as substituents in the 1- and 3-positions and alkyl groups having one to four carbon atoms as substituents in the 5-position.

In accordance with this invention, these and other objects are achieved and propylenureas having the general formula:

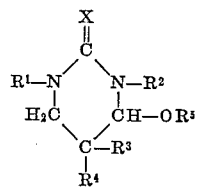

(I)

in which $R^1$, $R^2$ and $R^5$ denote hydrogen atoms or alkyl groups having one to four carbon atoms, $R^3$ and $R^4$ denote alkyl groups having one to four carbon atoms and X denotes an oxygen atom or a sulfur atom obtained by reacting a urea or thiourea having the general formula:

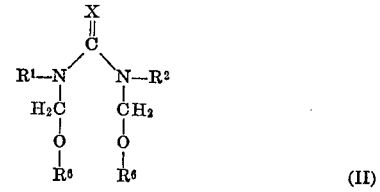

(II)

in which $R^1$, $R^2$ and X have the above meanings and $R^6$ denotes a hydrogen atom or an alkyl group having one to four carbon atoms, with a urea or thiourea having the general formula:

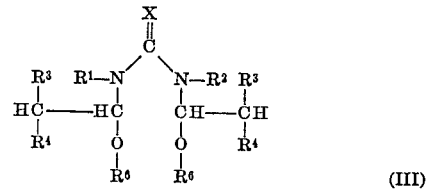

(III)

in which $R^1$, $R^2$, $R^3$, $R^4$, $R^6$ and X have the above meanings, in a molar ratio of about 1:1 at temperatures of from 30° to 100° C. in the presence of acids and in the presence or absence of an alkanol having the formula $R^5OH$ in which $R^5$ has the above meaning, and in the presence or absence of solvents and/or diluents.

The ureas or thioureas having the general Formula II may also be used in the form of mixtures (obtained by reaction of a urea or thiourea having the formula:

(IV)

in which $R^1$, $R^2$ and X have the meanings given above, with formaldehyde in a molar ratio of about 1:2 in the presence or absence of an alkanol having the general formula $R^5OH$ in which $R^5$ has the above meaning for reaction with the urea or thiourea having the Formula III. The ureas and thioureas having the Formula III may also be used in the form of reaction products obtained by reaction of ureas or thioureas having the formula:

(IV)

in which $R^1$, $R^2$ and X have the above meanings, with aldehydes having the formula:

(V)

in which $R^3$ and $R^4$ have the above meanings in a molar ratio of about 1:2 in the presence or absence of an alkanol having the formula $R^5OH$ in which $R^5$ has the above meaning.

Reaction products containing two moles of formaldehyde per mole of urea or thiourea may have in the molecule the structures having the general Formulae VI, VII and VIII:

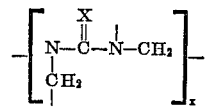

(VI)

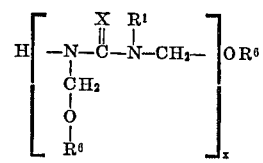

(VII)

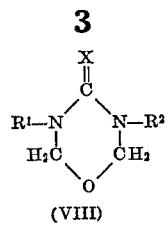

(VIII)

Reaction products which contain, per mole of urea or thiourea, two moles of an aldehyde having the general Formula V may contain the structures having the general Formulae IX, X and XI in the molecule:

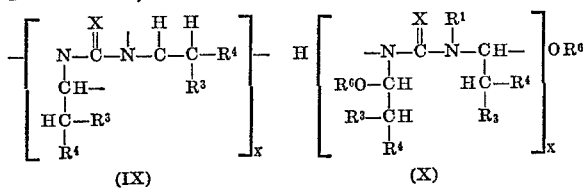

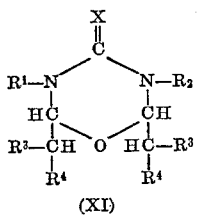

(XI)

$x$ in Formulae VI, VII, IX and X denotes one of the integers 2, 3, 4 and 5.

Examples of starting materials having the general Formula II which may be used are: N,N'-dimethylolurea, N,N' - dimethyl - N,N' - dimethylolurea, N,N'-dimethoxymethylurea and the equivalent thioureas. Examples of starting materials corresponding to the general Formula III are: N,N'-di-α-isobutylolurea, N,N'-di-α-hydroxy-2'ethylhexylurea, N,N'dimethoxyisobutylurea and the corresponding thioureas. Examples of compounds having the general Formula VI are condensation products of urea with two moles of formaldehyde and the corresponding reaction products of thiourea with two moles of formaldehyde. Examples of compounds having the general Formula VII are the methylol compounds of polymethyleneureas and polymethylenethioureas and the methoxymethyl compounds of polymethylenureas and polymethylenethioureas. Examples of compounds having the general Formula VIII are: N,N'-dimethylurone and N,N'-dibutylurone. Examples of compounds having the general Formula IX are the condensation products of urea or thiourea with isobutyraldehyde in the molar ratio of 1:2, and examples of compounds having the general Formula X are the α-isobutylol compounds of polyisobutylidenurea and the α-methoxyisobutyl compounds of polyisobutylidenurea and the corresponding thiourea compounds. An example of a compound having the general Formula XI is N,N'-dimethyl - 2,6-diisopropyl-1,3,5-tetrahydroxadiazine-4-one.

Strong acids which do not oxidize under the reaction conditions are used as acids. Thus for example dry hydrogen chloride, concentrated hydrochloric acid, sulfuric acid, oxalic acid, sulfonated ion exchangers or p-toluenesulfonic acid may be used. The acids are advantageously used in amounts of 1 to 30% by weight (with reference to the starting materials used).

Alkanols having the formula $R^5OH$ may be for example methanol, ethanol and isopropanol. They are used in general in amounts of 50 to 200% by weight with reference to the starting materials. They are used when $R^5$ in the Formula I is to be an alkyl group.

It is advantageous to carry out the process in the presence of solvents or diluents, for example ethers, such as dioxane or tetrahydrofuran, or alkanols preferably having one to four carbon atoms. The alkanols having the formula $R^5OH$ are also suitable solvents. Solvents may be used singly or mixed. The reaction of the starting materials having the general Formulae II, III, IV and X is advantageously carried out in the molar ratio of 1:1, because the reactants are used up in this molar ratio in the reaction. Slight deviations from this molar ratio, for example up to 10 mole percent, are possible.

It is advantageous to carry out the reaction at from 30° to 100° C., preferably from 50° to 80° C.

The process according to this invention is a condensation reaction which leads, with disproportionation of the starting materials with carbon-carbon linkage and simultaneous cyclization, to compounds having the general Formula I. Cyclization may be accelerated by adding more acid, with or without an increase in the reaction temperature. In many cases it is possible however, to obtain the 4-hydroxypropylenureas, 4-alkoxypropylenureas, 4-hydroxypropylenethioureas and 4-alkoxypropylenethioureas in the presence of large amounts of acid. On the other hand it is also possible to carry out the reaction at elevated temperature in the presence of less acid. The choice of temperature depends on the reactants used and may be lowered when the amount of acid added is increased and vice versa.

The new compounds having the Formula I which can be prepared according to this process are valuable intermediates for the production of leather auxiliaries, auxiliaries for the paint and lacquer industry, and pesticides. They are also slow-release fertilizers which retain their activity for a long time under the action of weather and bacteria. They are used for example in an amount of 10 to 18 kilograms per 100 square meters of cultivated area in the case of grass (lawns), sugar beet or beetroot.

The invention is further illustrated by the following examples. The parts specified are parts by weight.

EXAMPLE 1

100 parts of 50% sulfuric acid is added while stirring to 120 parts of dimethylolurea and 232 parts of di-α-methoxyisobutylurea in 500 parts of methanol and the whole is heated at refluxing temperature for ten hours. It is then cooled to room temperature and neutralized with caustic soda solution. The deposited sodium sulfate is filtered off and the filtrate concentrated to 500 parts under subatmospheric pressure. The whole is allowed to stand overnight and the deposited reaction product is filtered off and dried. 130 parts of 4-methoxy-5,5-dimethylpropylenurea is obtained. The compound may be recrystallized from acetone. The melting point is 149° to 150° C.

Analysis.—$C_7H_{14}O_2N_2$ (158) Calculated: C, 53.2%; H, 8.85%; O, 20.2%; N, 17.7%; $CH_3O$, 19.6%. Found: C, 53.3%; H, 8.7%; O, 19.9%; N, 17.8%; $CH_3O$, 19.0%.

EXAMPLE 2

A mixture of 130 parts of 3,5-dimethyl-1,3,5-tetrahydrooxadiazine-4-one and 204 parts of di-α-isobutylolurea in 1000 parts of methanol is heated with stirring with an addition of 60 parts of concentrated hydrochloric acid for six hours at refluxing temperature in a stirred vessel. The reaction mixture is then cooled to room temperature and neutralized with caustic soda solution. The filtered reaction solution is evaporated under subatmospheric pressure. Deposited sodium chloride is again removed by filtration. 160 parts of crude product is obtained. Purification of the 4-methoxy-1,3,5,5-tetramethylpropylenurea is carried out by distillation in a high vacuum (boiling point at 0.5 mm. Hg: 110° to 114° C.).

EXAMPLE 3

A mixture of 120 parts of dimethylolurea, 204 parts of di-α-isobutylolurea and 700 parts of water has 100 parts of 50% aqueous sulfuric acid added to it and the whole is heated for five hours at 75° to 80° C. in a stirred flask having a reflux condenser. The precipitate which is formed immediately after addition of the acid redissolves after twenty to thirty minutes. The whole is neutralized with about 20% caustic soda solution and the reaction solution is evaporated at subatmospheric pressure to about 600 parts and allowed to stand for one day. The precipitated reaction product is filtered off and dried. 140 parts of 4-hydroxy-5,5-dimethylpropyleneurea is obtained. The product can be recrystallized from water.

*Analysis.*—$C_6H_{12}O_2N_2$ (144) Calculated: C, 50.0%; H, 8.34%; N, 19.45%. Found: C, 49.6%; H, 84%; N, 19.2%.

EXAMPLE 4

60 parts of urea is dissolved in 200 parts of a 30% aqueous formaldehyde solution and 5 parts of concentrated hydrochloric acid is added while stirring. After a short time a precipitate of polymethyleneurea is formed which contains in combination two moles of formaldehyde for each mole of urea. In another stirred vessel, 144 parts of isobutyraldehyde is added to a solution of 60 parts of urea in 300 parts of water and the whole is acidified with 5 parts of concentrated hydrochloric acid. While stirring, a polycondensate is formed which contains about 2 moles of isobutyraldehyde combined with each mole of urea.

The two reaction mixtures are brought together in a stirred vessel provided with a reflux condenser, 50 parts of concentrated hydrochloric acid is added and the whole is heated for five hours at 80° C. The whole is then cooled to room temperature, neutralized with caustic soda solution and filtered. The filtrate is concentrated to about 550 parts under subatmospheric pressure. After having stood for one to two days, the reaction product is filtered off and dried. 108 parts of 4-hydroxy-5,5-dimethylpropyleneurea is obtained. The product may be recrystallized from water. Data obtained by elementary analysis and infrared spectroscopic investigation agree with the data of a comparison product prepared by another method.

I claim:

1. A process for the production of a propyleneurea having the general formula:

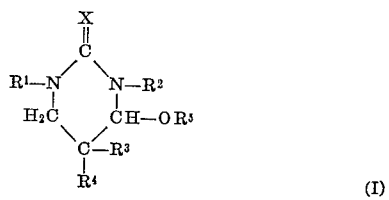

(I)

in which each of $R^1$, $R^2$ and $R^5$ denotes a hydrogen atom or an alkyl group having one to four carbon atoms, $R^3$ and $R^4$ denote alkyl groups having one to four carbon atoms and X denotes an oxygen atom or a sulfur atom, which comprises reacting urea having the general formula:

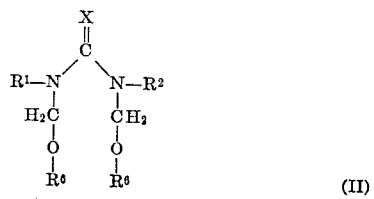

(II)

in which $R^1$, $R^2$ and X have the meanings given above and $R^6$ denotes a hydrogen atom or an alkyl group having one to four carbon atoms, with a urea having the general formula:

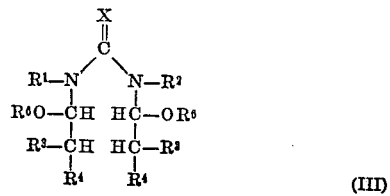

(III)

in which $R^1$, $R^2$, $R^3$, $R^4$, $R^6$ and X have the meanings given above, in a molar ratio of about 1:1 at temperatures of from 30° to 100° C. in the presence of acids, the reaction being carried out in the presence of an alkanol having one to four carbon atoms when $R^5$ in the Formula I denotes an alkyl group having one to four carbon atoms.

2. A process as claimed in claim 1 which comprises using, instead of the urea having the Formula II, a reaction mixture containing mainly the urea having the Formula II and which has been obtained by reacting a urea having the general formula:

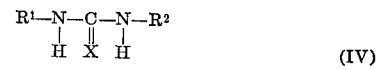

(IV)

in which $R^1$ and $R^2$ each denotes a hydrogen atom or an alkyl group having one to four carbon atoms and X denotes an oxygen atom or sulfur atom, with formaldehyde in a molar ratio of about 1:2.

3. A process as claimed in claim 1 which comprises using, instead of the urea having the general Formula III, a reaction mixture containing mainly the urea having the Formula III and which has been obtained by reacting a urea having the general formula

(V)

in which $R^3$ and $R^4$ have the meanings given above, in a molar ratio of about 1:2.

4. A process as claimed in claim 1 which comprises using, instead of the urea having the general Formula II, a reaction mixture containing mainly the urea having the general Formula II and which has been obtained by reacting a urea having the general formula

(IV)

in which $R^1$ and $R^2$ each denotes a hydrogen atom or an alkyl group having one to four carbon atoms and X denotes an oxygen atom or a sulfur atom, with formaldehyde in molar ratio of about 1:2 and using, instead of the urea having the general Formula III, a reaction mixture containing mainly the urea having the general Formula III and which has been obtained by reacting a urea having the general formula

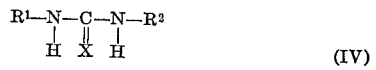

(IV)

in which $R^1$, $R^2$ and X have the meanings given above, with an aldehyde having the general formula

(V)

in which $R^3$ and $R^4$ have the above meanings, in a molar ratio of about 1:2.

5. A process as claimed in claim 1 wherein the reaction is carried out at from 50° to 80° C.

6. A process as claimed in claim 1 wherein the reaction is carried out in the presence of a solvent or diluent.

References Cited

UNITED STATES PATENTS 2,887,485   5/1959   Yost _____ 260—251

ALEX MAZEL, *Primary Examiner.*

R. V. RUSH, *Assistant Examiner.*

U.S. Cl. X.R.

71—92